United States Patent [19]

Yasue et al.

[11] Patent Number: 4,771,386
[45] Date of Patent: Sep. 13, 1988

[54] METHOD AND SYSTEM FOR SHIFT CONTROL OF AN AUTOMATIC TRANSMISSION FOR VEHICLE

[75] Inventors: Hideki Yasue; Kagenori Fukumura, both of Toyota, Japan

[73] Assignee: Toyota Jidosha Kabushiki Kaisha, Toyota, Japan

[21] Appl. No.: 854,501

[22] Filed: Apr. 22, 1986

[30] Foreign Application Priority Data

Apr. 24, 1985 [JP] Japan .................. 60-87984

[51] Int. Cl.⁴ .................. B60K 41/08; G05D 29/00
[52] U.S. Cl. .................. 364/424.1; 74/866
[58] Field of Search .............. 364/424.1; 76/866, 867, 76/868, 869

[56] References Cited

U.S. PATENT DOCUMENTS

| | | | |
|---|---|---|---|
| 4,346,626 | 8/1982 | Kawamoto | 74/866 |
| 4,411,174 | 10/1983 | Yokoi et al. | 74/866 |
| 4,417,307 | 11/1983 | Kubo et al. | 364/424.1 |
| 4,495,457 | 1/1985 | Stahl | 364/424.1 |
| 4,560,024 | 12/1985 | Noda et al. | 74/866 |
| 4,635,508 | 1/1987 | Tatsumi | 74/866 |
| 4,674,364 | 6/1987 | Shindo et al. | 74/867 |

*Primary Examiner*—Felix D. Gruber
*Attorney, Agent, or Firm*—Oblon, Fisher, Spivak, McClelland & Maier

[57] ABSTRACT

A shift control of an automatic transmission for a vehicle, which includes a first transmission section capable of automatically shifting gears in association with at least vehicle speed and engine load and a second transmission section capable of shifting between the lower gear side and the higher gear side, wherein the first transmission section and the second transmission section are simultaneously or alternately shifted, to thereby achieve multi-gear shifts, such that when shifting is to be achieved by shifting the first transmission section and the second transmission section in directions opposite to each other, shifting into the gear is prohibited.

2 Claims, 6 Drawing Sheets

FIG. 3A

| GEARS OF AUTOMATIC TRANSMISSION AS A WHOLE | GEARS OF FIRST TRANSMISSION SECTION | GEARS OF SECOND TRANSMISSION SECTION | GEARS IN FIG. 6 | NOMINAL GEARS |
|---|---|---|---|---|
| 1ST | 1ST | NON-OVERDRIVE | 1ST | 1ST |
| 2ND | 2ND | " | 3RD | 2ND |
| 3RD | 3RD | " | 5TH | 3RD |
| 4TH | 3RD | OVERDRIVE | 6TH | 4TH |

*WHEN THROTTLE OPENING IS LESS THAN VALUE θx

FIG. 3B

| GEARS OF AUTOMATIC TRANSMISSION AS A WHOLE | GEARS OF FIRST TRANSMISSION SECTION | GEARS OF SECOND TRANSMISSION SECTION | GEARS IN FIG. 6 | NOMINAL GEARS |
|---|---|---|---|---|
| 1ST | 1ST | NON-OVERDRIVE | 1ST | 1ST |
| 2ND | 2ND | " | 3RD | 2ND |
| 3RD | 2ND | OVERDRIVE | 4TH | 2S |
| 4TH | 3RD | " | 6TH | 4TH |

*WHEN THROTTLE OPENING IS VALUE θx OR MORE

FIG. 6 PRIOR ART

| GEARS OF AUTOMATIC TRANSMISSION AS A WHOLE | GEARS OF FIRST TRANSMISSION SECTION | GEARS OF SECOND TRANSMISSION SECTION |
|---|---|---|
| 1ST | 1ST | NON-OVERDRIVE |
| 2ND | 1ST | OVERDRIVE |
| 3RD | 2ND | NON-OVERDRIVE |
| 4TH | 2ND | OVERDRIVE |
| 5TH | 3RD | NON-OVERDRIVE |
| 6TH | 3RD | OVERDRIVE |

METHOD AND SYSTEM FOR SHIFT CONTROL OF AN AUTOMATIC TRANSMISSION FOR VEHICLE

BACKGROUND OF THE INVENTION

1. Field of the Invention

This invention relates to a method and a system for shift control of an automatic transmission for a vehicle, and more particularly to improvements in a method and a system of shift control of an automatic transmission for a vehicle, wherein there are provided a first transmission section capable of automatically shifting gears in association with at least vehicle speed and engine load and a second transmission section capable of automatically shifting at least between the lower gear side and the higher gear side, and wherein the first transmission section and the second transmission section are simultaneously or alternately shifted, to thereby achieve multi-gear shifts.

2. Description of the Prior Art

As the FF (Front engine—Front drive) has been used more widely in the driving system of vehicles in recent years, there have occurred trends of high rpms and high output in an engine mounted on the vehicle. An automatic transmission of the FF system presents a disadvantage in that it is extremely difficult to increase the number of plates in a multi-plate clutch and in a multi-plate brake of a frictionally engaging device due to the restriction placed upon the total length of the automatic transmission.

In view of the above-described disadvantage, to improve the durability of the frictionally engaging device in the automatic transmission, there has been proposed an automatic transmission, wherein a design change is made such that the number of gears to be achieved may be increased by use of the existing automatic transmission added thereto with a so-called overdrive mechanism.

For example, in an automatic transmission, wherein an overdrive mechanism is added to a first transmission section of forward three gears, such a design change may be made such that the overdrive mechanism in the form of a second transmission section is shifted simultaneously or alternately with the first transmission section, as shown in FIG. 6, so that multi-gear shifts of six forward gears can be achieved.

However, with the above-described automatic transmission, wherein the first transmission section and the second transmission section are simultaneously or alternately shifted to achieve the multi-gear shifts, there has occurred a disadvantage in that there are gears achieved as the result of the first transmission section and the second transmission section being shifted in directions opposite to each other, and, unless the timing of these shift operations into these gears are controlled adequately and strictly, fluctuations in torque are high, whereby an uncomfortable feeling is experienced by the driver.

More specifically, as shown in FIG. 6, when the automatic transmission as a whole is shifted up from 2nd gear to 3rd gear and from 4th gear to 5th gear for example, the first transmission section is shifted to high gear, whereas the second transmission section is shifted to low gear. When the automatic transmission as a whole is shifted down from 5th gear to 4th gear and 3rd gear to 2nd gear, the first transmission section is shifted to low gear, whereas the second transmission section is shifted to high gear. From the above-described reasons, unless these shifts are effected accurately with adequate timing, the fluctuations in torque can be high, and moreover, in an extreme case, such a strange driving sensation is experienced that a down shift is performed immediately after an up shift or an up shift is performed immediately after a down shift.

On the other hand, similarly, to insure the durability of the frictionally engaging device, there are instances where the normal order of shifting, i.e. 1st gear–3rd gear–5th gear–6th gear in FIG. 6 in the automatic transmission added thereto with the overdrive mechanism is changed to the order of 1st gear–3rd gear–4th gear–6th gear, for example. According to this method, the former and the latter are equal in terms of number of gears, however, instead of the 3rd–5th gear shift, which is performed by the frictionally engaging device (so-called direct clutch) where the durability is most severely required, the overdrive mechanism (the second transmission section) is shifted, with 2nd gear of the first transmission section being left as it is, to achieve 4th gear, while the 4th–6th gear shift is performed with the shift point being slightly low, so that the durability of the frictionally engaging device can be ensured. Normally, the above-described shift is performed only in a region where a throttle opening (engine load) is high, whereas, in a region where the throttle opening is low, the order of shift of 1st gear–3rd gear–5th gear–6th gear is performed as in the past.

However, even in the above-described case, there occur gears which are achieved by shifting the first transmission section and the second transmission section in directions opposite each other as in the 4th–5th gear shift or the 5th–4th gear shift. As a consequence, the aforesaid disadvantages similarly occur.

SUMMARY OF THE INVENTION

The present invention has been developed to obviate the above-described disadvantages of the prior art and has as its object the provision of a method and a system for shift control of an automatic transmission for a vehicle, wherein, even with the automatic transmission, in which a first transmission section and a second transmission section are shifted simultaneously or alternately to achieve multi-gear shifts, shifts can be performed with low shift shocks at all times.

To this end, the present invention contemplates that, in a method for shift control of an automatic transmission for a vehicle, wherein there are provided at least a first transmission section capable of automatically shifting gears in association with at least vehicle speed and engine load and a second transmission section capable of automatically shifting at least between the lower gear side and the higher gear side, the first transmission section and the second transmission section being simultaneously or alternately shifted, to thereby achieve multi-gear shifts, the method including the steps of: determining whether or not a type of shift into a gear is by requested shifting the first transmission section and the second transmission section in directions opposite to each other; and prohibiting a shift into the gear when the shift is requested into the gear by shifting the first transmission section and the second transmission section in directions opposite to each other.

A specific form of the present invention is of such an arrangement that, when a new shift need takes place during the prohibition of the shift, the prohibition of shifting is removed, so that the shift can be smoothly performed.

According to the present invention, when a type of shift into a gear is achieved by shifting the first transmission section and the second transmission section in directions opposite each other, the shift into the gear is prohibited, such that, as the result, only the shift into the gear achieved by shifting the first transmission section and the second transmission section in directions opposite to each other is omitted, so that the occurrences of high shift shocks can be suppressed, thus enabling satisfactory shift characteristics at all times. As a consequence, running of the vehicle with low shift shocks can be performed at all times.

According to the present invention, shifts into a specific gear are not prohibited. For example, a shift from 2nd gear to 3rd gear is prohibited because of the shift being achieved by the shift made in the reverse direction, however, the shift from 1st gear to 3rd gear is not prohibited because of the shift being achieved by only the shift of the first transmission section. The types of shifts prohibited according to the present invention include a shift from 4th gear to 5th gear, a shift from 5th gear to 4th gear, a shift from 3rd gear to 2nd gear, a shift from 5th gear to 2nd gear and the like, in addition to the shift from 2nd gear to 3rd gear.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIGS. 3A and 3B are charts showing the relationship between gears of the automatic transmission as a whole, the gears of the first transmission section, the gears of the second transmission section, and the nominal gears thereof;

FIG. 6 is a chart setting forth an explanation of the gears in the automatic transmission, wherein multi-gear shifts are achieved by shifting the first transmission section and the second transmission section simultaneously or alternately.

DESCRIPTION OF THE PREFERRED EMBODIMENT

A detailed description will now be given of one embodiment of the present invention with reference to the accompanying drawings.

Figure 2:
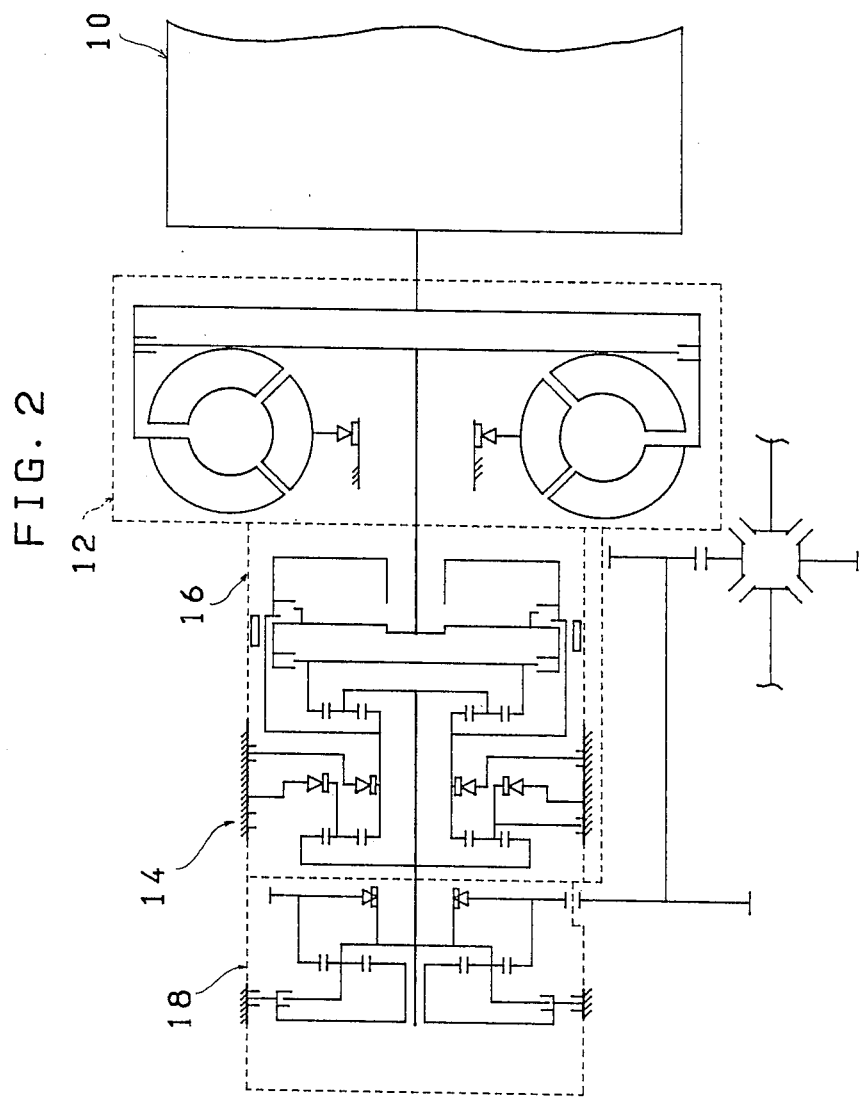
FIG. 2 is a skeletal view showing the automatic transmission for a vehicle, to which is applied the present invention.

FIG. 2 is a skeletal view showing the automatic transmission for FF, to which is applied the present invention. This automatic transmission includes a torque converter 12 and a transmission 14, which are provided coaxially with an engine 10, and the transmission 14 includes a first transmission section 16 and a second transmission section 18, which are connected in series with each other. Here the first transmission section 16 is standard drive device and has three forward gears, while the second transmission section 18 is an overdrive device and has two forward gears constituting by a lower gear side of a reduction gear ratio of 1 and a higher gear side for overdrive. Since the detailed gear arrangements of the first and the second transmission sections 16 and 18 are well known, only a skeletal view is shown in FIG. 2 and a detailed description thereof have been omitted.

FIGS. 3A and 3B show the relationship between the gears of the automatic transmission as a whole and the gears of the first and the second transmission sections 16 and 18. In this embodiment, such an arrangement is adopted that, when the throttle opening is less than a predetermined value $\theta x$, the first transmission section 16 is shifted up from 1st gear to 3rd gear (this shift corresponding to a shift from 1st gear to 5th gear in FIG. 6) with the second transmission section 18 being held at the lower gear. In addition, only when the first transmission section is at 3rd gear (5th gear in FIG. 6), the second transmission section is shifted into the higher gear side, whereby 4th gear (6th gear in FIG. 6) as the overdrive can be obtained. On the other hand, when the throttle opening is a predetermined value $\theta x$ or more, the first transmission section is made to be 2nd gear and the second transmission section is shifted into the higher gear side, so that 3rd gear (4th gear in FIG. 6) can be achieved.

For the sake of convenience, description will be given hereinbelow with reference to the nominal gears shown in FIGS. 3A and 3B.

Figure 4:
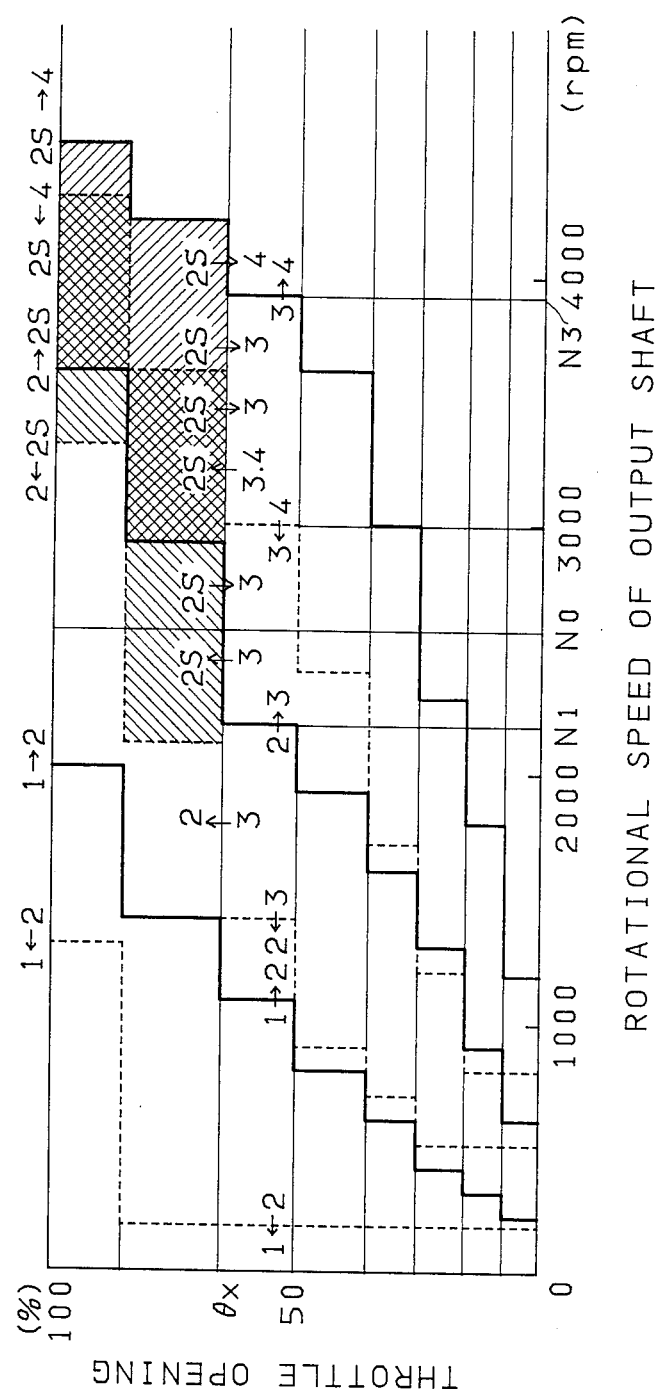
FIG. 4 is a chart showing a shift point map of the automatic transmission.

FIG. 4 is the chart showing a shift point map of the automatic transmission according to this embodiment. As is apparent from the drawing, when the rotational speed of an output shaft remains within a range from N1 to N3, shift from a 2 Special or 2S gear to 3rd gear and conversely occur, bordering on the throttle opening $\theta x$.

Figure 1:
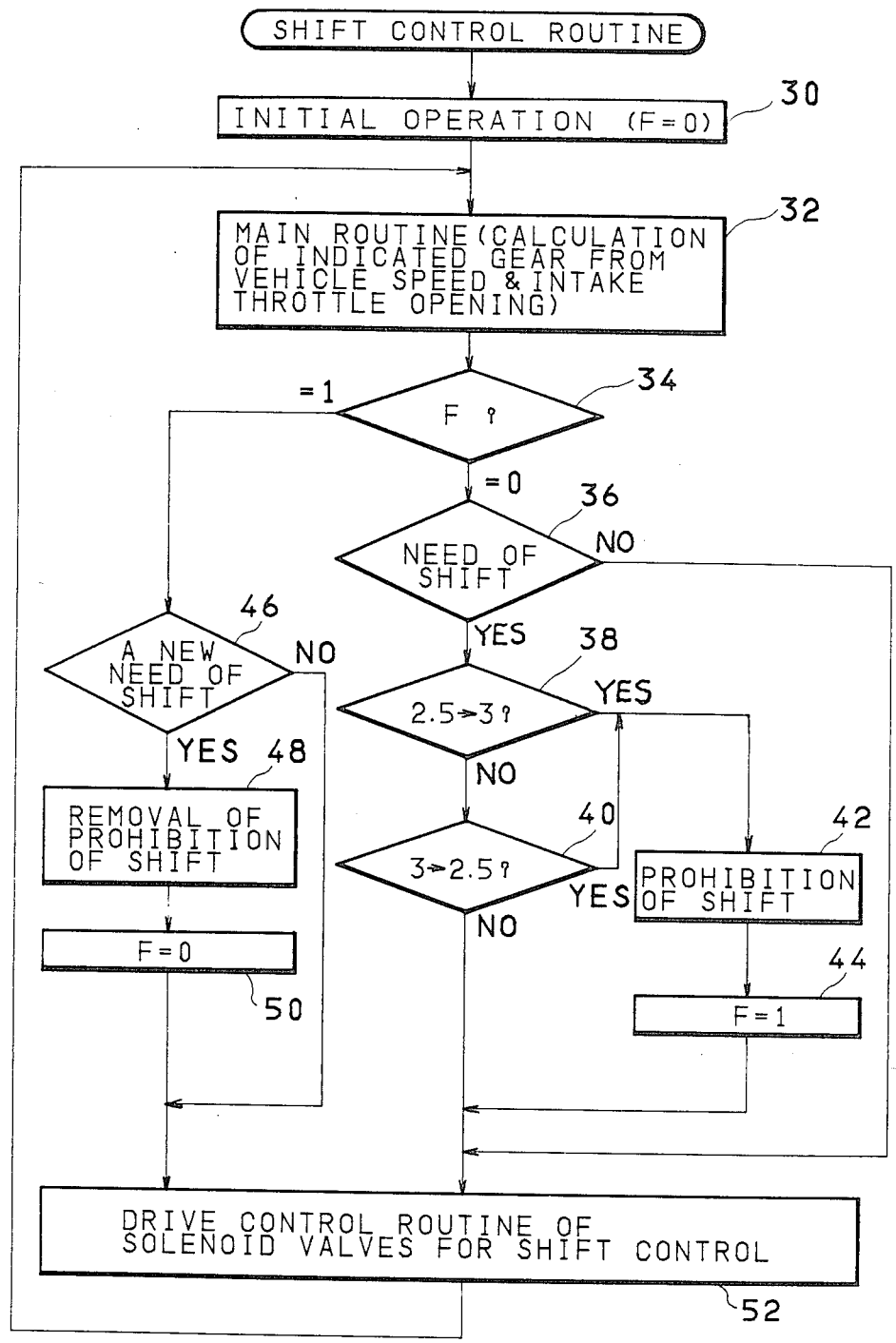
FIG. 1 is a flow chart showing one embodiment of the method for shift control of an automatic transmission for a vehicle according to the present invention.

A description will now be given of action of this embodiment with reference to the chart shown in FIG. 1.

Firstly, in Step 30, as an initial operation, a flag F is set at zero. The flag F is one for inspecting whether shifting of the automatic transmission is prohibited or not. In a main routine of Step 32, it is determined in what gear region the operating conditions at present are included, i.e. an indicated gear is determined from the vehicle speed and the engine load such as the throttle opening, or the output shaft torque of the engine.

Subsequently, the value of the flag F is judged in Step 34. Furthermore, in Step 36, a determination is made whether the gear at present is or is not different from the indicated gear determined in the main routine, i.e. whether there is a need for shifting or not. When F=0, i.e. it is not the period of the time during which the shift of the automatic transmission is prohibited, and there is no need for shifting, solenoid valves for shift control are driven in accordance with the indicated gear calculated in Step 32 (Step 52), and the automatic transmission becomes the indicated gear.

When it is determined that there is a need for shifting in Step 36, a judgment is made whether the shift is an up shift of the 2S-3rd gear (Step 38) or a down shift of the 3rd-2S gear (Step 40). When neither the former nor the latter is judged, the automatic transmission performs a shift in accordance with a newly indicated gear (Step 52), however, when either Step 38 or 40 is judged to be affirmative, a shift of the automatic transmission is prohibited (Step 42), and the flag F is set at 1 (Step 44).

When the flag F=1, the routine proceeds from Step 34 to Step 46. In Step 46, determination is made as to whether or not there is a new need for shifting occurring due to a difference between the indicated gear determined in the main routine of Step 32, and the gear, shifting of which is prohibited (in the case of an up shift of the 2S-3rd gear; the 3rd gear, and, in the case of a down shift of the 3rd-2S gear; the 2S gear). When there is no new need for shifting, shifting of the automatic transmission remains prohibited. However, when there occurs a new need for shifting, the prohibition of shifting of the automatic transmission is removed in Step 48, and the flag F is reset at zero in Step 50.

In the case of the prohibition of the 2S-3rd gear shift, as when there occurs a new need for shifting, there are three types of shifts, the 3rd-4th gear shift, the 3rd-2nd gear shift, and the 3rd-2S gear shift. Since the automatic transmission is held at the 2S gear, the types of the actual shifts generated when the prohibition of shift is removed include the 2S-4th gear shift, the 2S-2nd gear shift, and the 2S-2S gear shift, so that shock during shifting can be prevented because shifting is performed only in the first transmission section 16 or no shifting is performed. Furthermore, in the case of the prohibition of the 3rd-2S gear shift, there are three types of shifts, the 2S-4th gear shift, the 2S-2nd gear shift, and the 2S-3rd gear shift. However, since the automatic transmission is held at the 3rd gear, also in this case, the types of the actual shifts generated when the prohibition of shift is removed include the 3rd-4th gear shift, the 3rd-2nd gear shift and the 3rd-3rd gear shift, so that shock during shifting can be similarly prevented because shifting is performed in either the first transmission section 16 or the second transmission section, or no shifting is performed.

Figure 5:
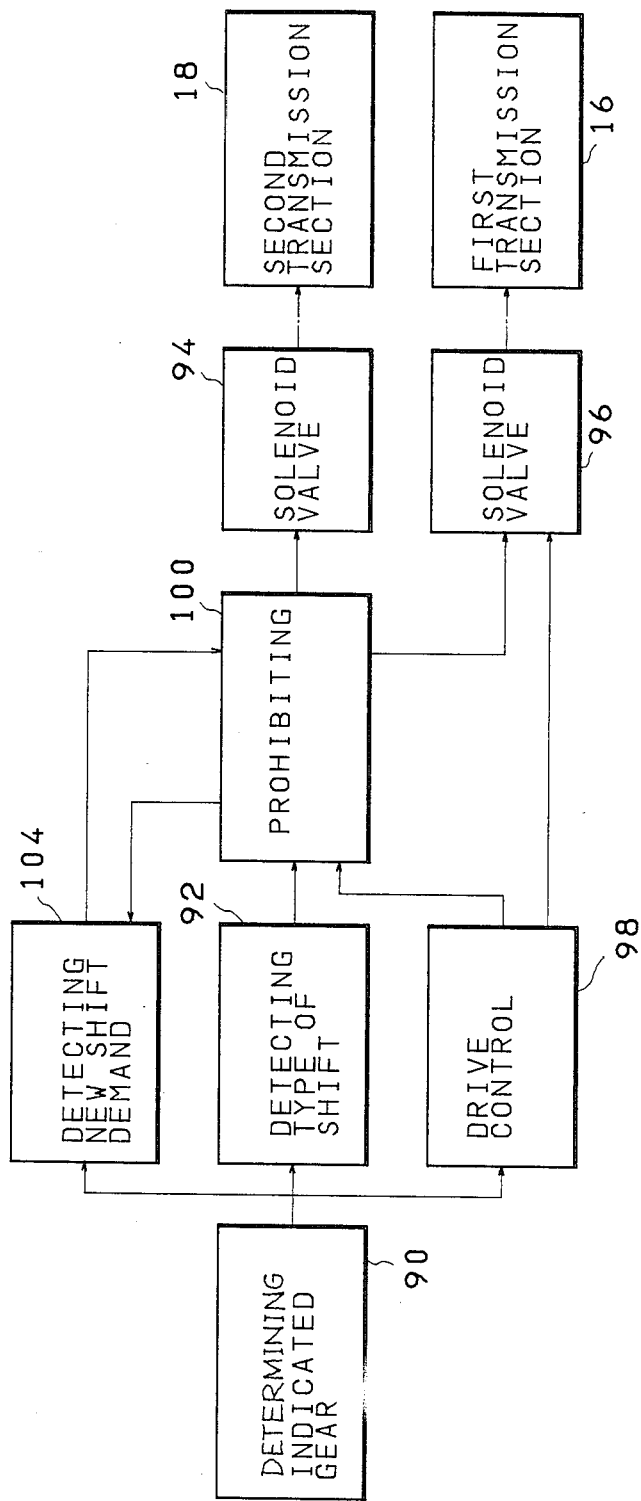
FIG. 5 is a block diagram setting forth an explanation of the functions of the automatic transmission.

FIG. 5 is the block diagram showing the function of the system in the above embodiment. Means 90 for determining an indicated gear serves to determine an indicated gear determined by the vehicle speed, the throttle opening and the like. Means 92 for detecting the type of shifting determines whether or not the type of shift is the 2S-3rd gear shift or the 3rd-2S gear shift. Solenoid valves 94 and 96 control the gears of the second transmission section 18 and of the first transmission section 16, respectively. Drive control means 98 drives the solenoid valves 94 and 96, so that the actual gears become the indicated gears. When the type of shift is the 2S-3rd gear shift or the 3rd -2S gear shift, prohibiting means 100 prohibits a change of driving signals of the solenoid valves 94 and 96, i.e. shifts of the second transmission section 18 and of the first transmission section 16. Means 104 for detecting a new need for shifting detects a new shift demand generated during the period of time of the prohibition of shifting, and, when there is a new need for shifting, removes the function of the prohibiting means 100.

Additionally, in the above embodiment, there has been shown an example of the automatic transmission for a vehicle wherein, only when the throttle opening is a predetermined value or more, the first transmission section and the second transmission section are shifted simultaneously or alternately, so that the multi-gear shifts can be achieved, the automatic transmission, to which is applied the present invention, need not necessarily be limited to this, and the present invention is applicable to the automatic transmission, wherein, for example, regardless of the throttle opening as described above, the first transmission section and the second transmission section are shifted simultaneously or alternately, to thereby achieve the multi-gear shifts of six forward gears.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for shift control of an automatic transmission for a vehicle, wherein there are provided at least a first transmission section capable of automatically shifting gears in association with at least vehicle speed and engine load and a second transmission section capable of shifting at least between a lower gear side and a higher gear side, said first transmission section and said second transmission section being shifted, to thereby achieve multi-gear shifts, which comprises:

generating a signal indicative of whether or not shifting to a gear is needed;

determining whether shifting is possible in opposite directions of said first and second transmissions; and prohibiting shifting if it has been determined that shifting in opposite directions is possible whereby the occurrences of high shift shock is suppressed.

2. In a system including means for shift control of an automatic transmission for a vehicle, comprising:

a first transmission section having gears for automatically shifting in association with at least vehicle speed and engine load, and a second transmission section having gears for automatically shifting at least between a lower gear side and a higher gear side, wherein said first transmission section and said second transmission section are selectively shifted to thereby achieve multi-gear shifts, comprising means for:

determining an indicated gear from said vehicle speed and engine load;

controlling said gears of said first transmission section and of said second transmission section;

driving said shift control means such that an actual operating gear comprises said indicated gear;

detecting a request for shifting to a gear achieved by shifting said first transmission section and said second transmission section in directions opposite each other;

prohibiting a change of a drive signal when a shift is requested by said shifting said first transmission section and said second transmission section in directions opposite each other; and detecting an indication of a request for shifting occurring during prohibition of shifting of said first transmission section and said second transmission section in directions other than opposite each other and removing the prohibition when said request occurs.

* * * * *